June 4, 1940.  W. H. SILVER  2,202,929
TILLING IMPLEMENT
Filed Sept. 16, 1938
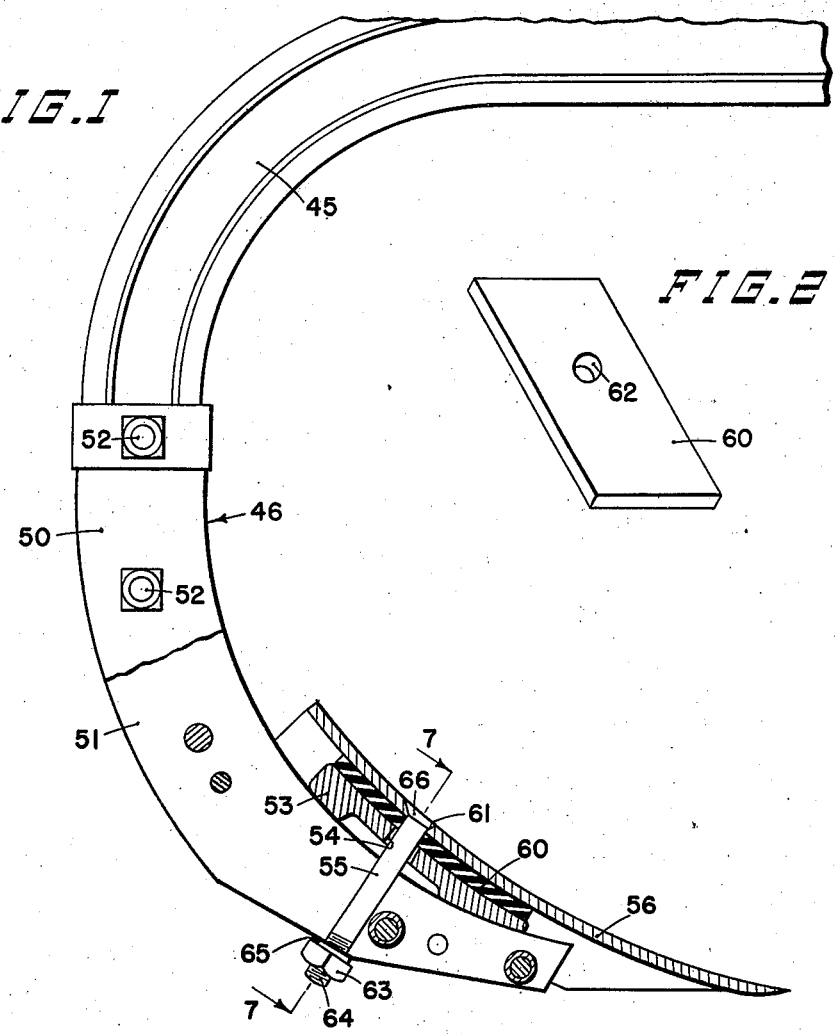
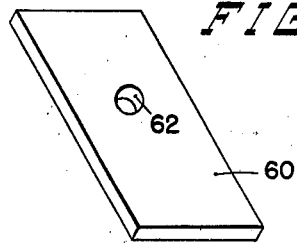
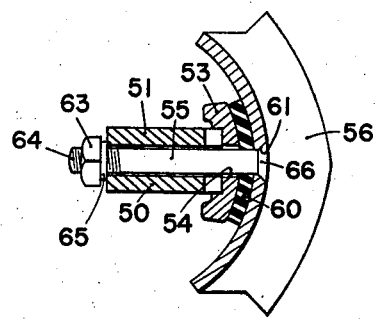
INVENTOR.
Walter H. Silver
BY
ATTORNEY.

Patented June 4, 1940

2,202,929

UNITED STATES PATENT OFFICE 2,202,929

TILLING IMPLEMENT

Walter H. Silver, Moline, Ill., assignor to Deere & Company, Moline, Ill., a corporation of Illinois Application September 16, 1938, Serial No. 230,242

3 Claims. (Cl. 97—184)

The present invention relates generally to tilling implements of the type having relatively delicate sharp cutting edges which are frequently brought into hard contact with relatively immovable objects such as stones and rocks while working in the fields, and which heretofore have been subject to excessive breakage and wear as a consequence thereof. This is particularly true of disk tillers and certain types of lister shovels, although it applies to a lesser degree to many of the other tilling implements in common use today.

Manufacturers and implement designers have been attempting for years to overcome this problem of excessive wear and breakage of such sharp edged tools, but their improvements have been heretofore along the lines of strengthening the tools by improved methods of heat treating and new alloys of steel, none of which has solved the problem and all of which have entailed increased costs. Spring trip release devices have been applied on tools of smaller sizes such as cultivators, but are not practical in their present form on the larger tools such as disk tillers. I have discovered, however, that when a very small amount of resiliency is introduced between the tool and its supporting standard, the wear and tear on the sharp cutting edges is greatly reduced and breakage of the tools is practically eliminated. The amount of resiliency required for protection is practically imperceptible, and the tool appears to be rigidly mounted on its support. In fact, an excess of flexibility in the mounting would be undesirable because the tool would not then be held in position to cut properly.

In tests that were conducted with blades rigidly mounted, and with blades yieldingly mounted, in accordance with my invention, the latter demonstrated their ability to withstand, without appreciable effect, shocks that broke or bent the rigidly mounted tools and otherwise rendered the same unfit for further use.

In stony fields in which frequent replacements of rigidly mounted blades are necessary, other blades, which were mounted in accordance with the teachings of my invention, showed very little evidence of deterioration and no failures requiring replacement of the tool were observed. The additional cost of mounting tools according to the present invention over the cost of mounting them rigidly, is very small, and is negligible in view of the savings obtained.

The principal object of the present invention, therefore, is to provide new and improved means for mounting a tool blade upon its supporting shank allowing a limited amount of relative movement therebetween.

A more specific object is to provide a resilient mounting for the ground engaging tool or tools of an agriculture machine or like implement, in which the tools are firmly held at the proper normal operating position but in which each tool is independently capable of yielding slightly to cushion shock impacts and to absorb excessive stresses.

Another specific object is to provide a resilient mounting for a plowing implement such as a lister shovel.

These and other objects and advantages of the present invention will become apparent to those skilled in the art after a consideration of the following detailed description, taken in conjunction with the accompanying drawing, in which Figure 1 is a fragmentary vertical cross sectional view of a lister shovel and supporting shank embodying the principles of my invention;

Figure 2 is a cross section taken substantially along the line 2—2 of Figure 1; and Figure 3 is a perspective view of the rubber pad placed between the shovel blade and tool shank.

One embodiment of my invention is illustrated in Figures 1, 2 and 3, to which reference is now directed. A tool beam 45 comprising part of an implement frame curves downwardly and rearwardly, and carries a standard 46 on its lower end. The standard 46 preferably comprises a pair of spaced bars 50 and 51 clamped to opposite sides of the beam 45 by bolts 52 and curving downwardly and forwardly therefrom in generally parallel relation. A block 53 is mounted on the two spaced bars 50, 51 and provides a surface curved to conform with the under side of the lister shovel 56, which it is adapted to receive. The block 53 is provided with a centrally located bolt hole 54 adapted to receive the shank of a connecting bolt 55. The lister shovel 56 is mounted upon the block 53, with a rubber pad 60 of generally rectangular outline (Figure 3) disposed between the top side of the block 53 and the under side of the shovel 56, and the whole is secured together by the connecting bolt 55 which is passed through aligned holes 61 in the shovel, 62 in the rubber pad 60, and 54 in the block 53. The bolt 55 passes between the standard bars 50, 51 and is secured thereto by a nut 63 screwed on the threaded end 64 of the bolt and clamping a washer 65 against the under side of the bars 50, 51. The head 66 of the bolt 55 is countersunk within the aperture 61 to bring it flush with the surface of the shovel 56.

The resilient backing thus afforded the shovel 56 by the rubber pad 60 allows the shovel to yield slightly under shock impacts and relieves the connecting bolt 55 of excessive stresses, thereby increasing the resistance of the tool to breakage and materially adding to the life of the sharp cutting edges.

While I have shown and described above the principles of my invention as embodied in a lister shovel, it is to be understood that my invention is not to be limited to the specific details shown and described, but that, in fact, widely different means may be employed in the greater aspects of my invention.

What I claim, therefore, and desire to secure by Letters Patent is:

1. A ground working tool comprising a supporting standard, a shovel, a rubber pad disposed between said shovel and said standard, and means for connecting said shovel to said standard comprising a connecting bolt passed through aligned openings in said shovel and said rubber pad, and a nut on said bolt adapted to bear against said standard for securing said bolt to said standard.

2. A ground working tool comprising a standard, a shovel having a slightly curved under side, a block adapted to be mounted on said standard and having one surface thereof curved to conform with the under side of said shovel, a rubber pad disposed between the curved surface of said block and the under side of said shovel, said shovel, rubber pad and block having aligned apertures formed therein, a connecting bolt passed through said aligned apertures, and means for connecting said bolt to said standard.

3. A ground working tool comprising a generally vertically disposed tool standard, an earth turning blade disposed adjacent the forward side of said shank, a resilient pad disposed between the rear surface of said blade and the forward side of said standard, and a bolt extending rearwardly through aligned openings in said blade, said pad and said standard and having a head bearing against said blade and a nut bearing against said standard, said resilient pad being of comparatively small thickness, whereby said blade can be clamped tightly against said standard with substantially no perceptible yielding movement therebetween but with sufficient yielding to protect the blade against injury upon encountering an obstruction.

WALTER H. SILVER.